(12) United States Patent
Marder et al.

(10) Patent No.: US 12,093,836 B2
(45) Date of Patent: Sep. 17, 2024

(54) AUTOMATIC MULTI-OBJECTIVE HARDWARE OPTIMIZATION FOR PROCESSING OF DEEP LEARNING NETWORKS

(71) Applicant: Intel Corporation, Santa Clara, CA (US)

(72) Inventors: Mattias Marder, Haifa (IL); Estelle Aflalo, Tel Aviv (IL); Avrech Ben-David, Haifa (IL); Shauharda Khadka, Lake Forest, WA (US); Somdeb Majumdar, Mission Viejo, CA (US); Santiago Miret, Oakland, CA (US); Hanlin Tang, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 756 days.

(21) Appl. No.: 17/129,521

(22) Filed: Dec. 21, 2020

(65) Prior Publication Data

US 2021/0150371 A1    May 20, 2021

(51) Int. Cl.
*G06N 3/10*    (2006.01)
*G06N 3/045*    (2023.01)
*G06N 3/086*    (2023.01)

(52) U.S. Cl.
CPC .............. *G06N 3/10* (2013.01); *G06N 3/045* (2023.01); *G06N 3/086* (2013.01)

(58) Field of Classification Search
CPC .......... G06N 3/10; G06N 3/045; G06N 3/086
USPC ........................................................... 706/25
See application file for complete search history.

(56) References Cited

U.S. PATENT DOCUMENTS 11,704,562 B1 *  7/2023  Khaitan ................. G06N 3/063
                                                     706/25
2021/0392049 A1 * 12/2021 Jeuk ........................ H04L 41/16

OTHER PUBLICATIONS

Venieris et al., "fpgaConvNet: A Framework for Mapping Convolutional Neural Networks on FPGAs", 2016 IEEE 24th Annual International Symposium on Field-Programmable Customer Computing Macines, 2016 (Year: 2016).*
Guan et al., "FP-DNN: An Automated Framework for Mapping Deep Neural Networks onto FPGAs with RTL-HLS Hubrid Templates", 2017 (Year: 2017).*
Notification of Publication of Chinese Patent Application No. 202111353238.9 mailed Jun. 27, 2022, 3 pages.

* cited by examiner

*Primary Examiner* — Tsu-Chang Lee
(74) *Attorney, Agent, or Firm* — JAFFERY WATSON MENDONSA HAMILTON LLP

(57) ABSTRACT

Automatic multi-objective hardware optimization for processing a deep learning network is disclosed. An example of a storage medium includes instructions for obtaining client preferences for a plurality of performance indicators for processing of a deep learning workload; generating a workload representation for the deep learning workload; providing the workload representation to machine learning processing to generate a workload executable, the workload executable including hardware mapping based on the client preferences; and applying the workload executable in processing of the deep learning workload.

20 Claims, 10 Drawing Sheets

AUTOMATIC MULTI-OBJECTIVE HARDWARE OPTIMIZATION FOR PROCESSING OF DEEP LEARNING NETWORKS

FIELD

This disclosure relates generally to machine learning, and more particularly to hardware optimization for processing of deep learning networks.

BACKGROUND OF THE DISCLOSURE

Neural networks operate in an increasing number of operations and settings as the abilities of such networks are directed to more objectives in deep learning. However, the effectiveness of neural network processing is greatly affected by hardware selection for use in network inference.

Optimization of the performance of a deep learning workload is typically a highly time-consuming effort. This is especially true when the performance may be defined by several different performance indicators, such as throughput, latency, core coverage, and power consumption. Typically, the optimization process for a deep learning workload enablement is largely performed manually.

For example, certain heuristics may be utilized to map various tensors to on-board memory, or atomic operations to on-board compute cores. The resulting network performance often depends significantly on the effectiveness of this hardware mapping. Further, any adjustment in the applicable performance measures may require that the hardware mapping be repeated, thus further increasing the cost of operation.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers will be used throughout the drawing(s) and accompanying written description to refer to the same or like parts.

DETAILED DESCRIPTION

Figure 1:
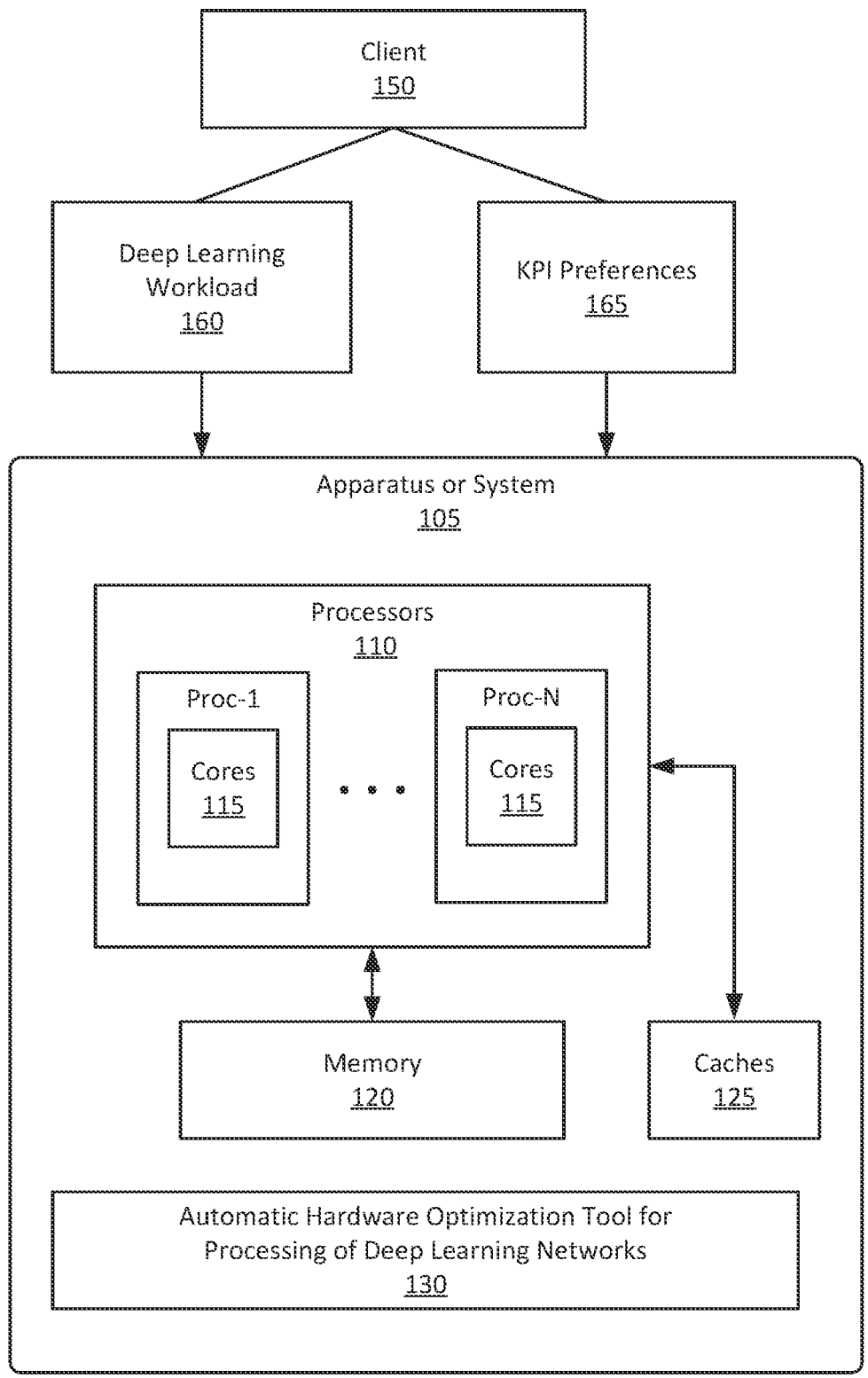
FIG. 1 is an illustration of multiple objective hardware optimization for deep learning, according to some embodiments.

Implementations of the disclosure describe automatic multi-objective hardware optimization for processing a deep learning network. In some embodiments, an apparatus, system, or process provides an automatic, data driven optimization framework that is capable of jointly optimizing on a range of performance objectives for neural network inference hardware.

In deep learning, effective mapping of processing hardware for deep learning can have a great impact on the performance of a neural network in processing a particular workload. Further, in many implementations, a client may be unable to identify a single performance objective or indicator, which may be referred to as a KPI (Key Performance Indicator), as an optimization target, but rather may view multiple KPIs as important. In such a case, the client generally must be presented with all of the available options in order to make a skilled choice between the tradeoffs.

In order to present clients with a view of the available tradeoffs, the optimization work that is needed grows exponentially with the number of performance indicators. Optimizing for a single performance indicator manually is difficult, but optimizing for many performance indicators simultaneously is impractical for manual or rules-driven optimization.

A typical approach to manage multiple sub-KPIs is to create a primary or master KPI that encapsulates the desired optimization goal via linear or non-linear combinations of the sub-KPIs. A significant drawback of this method is that, for a given inference hardware and workload, the hardware mapping strategy has to be re-done each time that the master KPI changes. This may occur in a situation in which, for example, two different clients wish to run a same or similar workload on the same hardware, but value the different sub-KPIs differently.

In some embodiments, an apparatus, system, or process provides an automatic, data driven optimization framework that is capable of jointly optimizing on multiple performance indicators for neural network inference compute hardware. The optimization framework may be implemented to provide substantial improvements in performance compared to hand-designed, rule-based optimization strategies.

In some embodiments, a system is to build a Pareto optimal front (i.e., an operation in which no objective can be improved without worsening at least one other objective) by implementing a population of different mapping strategies that each optimize some random combination of the canonical sub-KPIs of a system (e.g., power consumption, throughput, core coverage, latency, and any other performance indicators). In some embodiments, this operation may be provided without incurring additional costs as a population-based solution is a core reinforcement learning driven approach to solve the optimization problem. In some embodiments, this feature is applied to select a candidate solution that has a closest match to the specific master KPI that a client wants. Once a trained population is obtained, then multiple variations of the KPIs can be addressed without needing to re-train the optimizer.

In some embodiments, in order to solve a multi-objective optimization requirement, the problem is formulated as a reinforcement learning (RL) problem in which an agent is rewarded for discovering the most optimal hardware mapping policy for a given set of performance indicators. In general, reinforcement learning refers to a form of machine learning method in which an agent receives a delayed reward in a next time step to evaluate its previous action. A reinforcement learning operation is generally composed of an agent and an environment, wherein the agent is an RL algorithm, and environment is the object that the agent is acting upon.

In some embodiments, a population based RL algorithm is applied, wherein a population of "learners" collaboratively optimize on one or more objectives (one or more performance indicators) while generating and sharing data with each other. In addition, a genetic search module (neuro-evolution) allows a system to directly combine policies with each other to significantly speed up the search process in a gradient-free learning scenario. The application of such an RL algorithm is more specifically described with regard to FIG. 5.

In some embodiments, an optimization tool may be utilized to alleviate the need for re-training policies for every unique combination of sub-objectives, allowing for significant improvements in operation as different clients may have very different priorities in weighting the different performance indicators. The optimization tool may also be used by hardware and software designers to rapidly identify the essential bottlenecks in a workload enablement. For each optimized result generated by the optimization tool, hardware and software designers are enabled to quickly determine where bottlenecks are located by inspecting hardware traces of the deployed optimized solution. By knowing the bottlenecks after optimization, designers may then determine what the most critical work items at hand are.

FIG. 1 is an illustration of multiple objective hardware optimization for deep learning, according to some embodiments. As illustrated, a computing apparatus or system 105 is to process a deep learning workload 160 for an particular client or other agent 150 utilizing computer hardware. The compute hardware includes a set of processing resources, which may include resources of one or more processors 110 (shown as Proc-1 through Proc-N with processing cores 115), resources of a hardware accelerator, or other processing elements. The set of processing resources may include, but are not limited to, processing resources of one or more central processing units (CPUs), one or more graphics processing units (GPUs), one or more embedded processors, or other types of processing elements. Also illustrated are a computer memory 120 and cache memories 125 to hold data processing including processing of the deep learning workload.

In a particular scenario, the deep learning workload 160 is to be processed according to preferences regarding a set of multiple performance indicators, shown as KPI preferences 165, wherein the set of performance indicators may include, but are not limited to, throughput, latency, core coverage, and power consumption. For example, the KPI preferences may include weighting between performance indicators, thresholds for one or more performance indicators, or both. In some embodiments, the apparatus or system further includes an automatic hardware optimization tool for processing of deep learning networks 130. In some embodiments, the optimization tool 130 is to optimize the processing resources of the apparatus or system according to the KPI preferences 165.

In some embodiments, in order to generate one or more hardware mappings in response to performance indicator preferences, an apparatus, system, or process utilizes a reinforcement learning (RL) operation as follows:

(1) Population-based reinforcement learning algorithm: In some embodiments, different sub-populations are optimized based on different canonical KPIs (such as throughput, power consumption, core coverage, and latency). The optimization process finds the Pareto optimal front for each of the KPIs. Each member of the population is a stand-alone policy that can perform hardware mapping on a given workload.

(2) Weighting of performance indicator preferences: A user (client or customer) is allowed to weight the KPIs to indicate the user's preferences. The weighting of the KPIs may include, but is not limited to, the use of an interface such as the example illustrated in FIG. 2.

(3) Search for hardware mapping: The apparatus, system, or process is to provide for searching along the Pareto optimal front generated in (1) to identify one or more policies having a closest weighted KPI, and deploy a policy of the one or more policies during run time.

Figure 2:
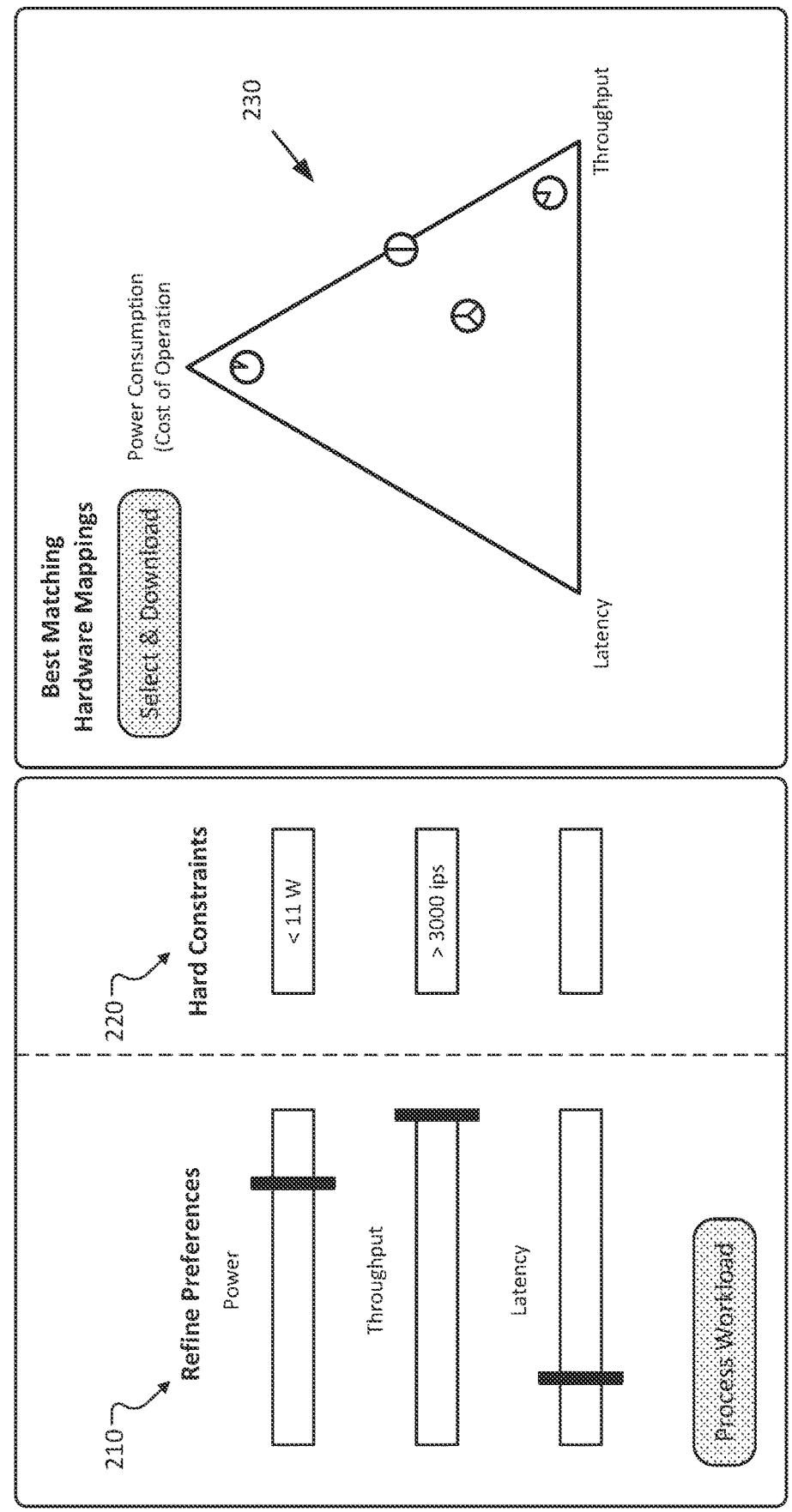
FIG. 2 illustrates an example of an interface to input performance indicator preferences, according to some embodiments.
Figure 7A:
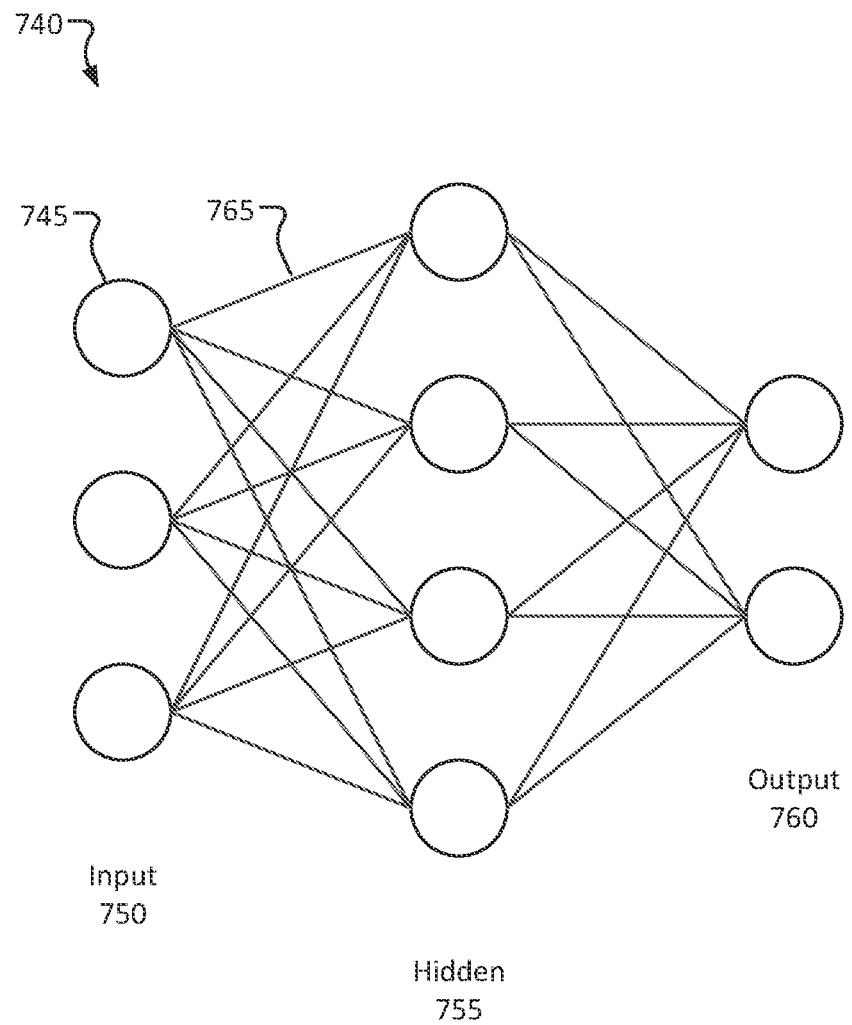
FIGS. 7A-7C illustrate examples of neural networks that may be processed utilizing processing hardware that has been configured according to client preferences, according to some embodiments.
Figure 7B:
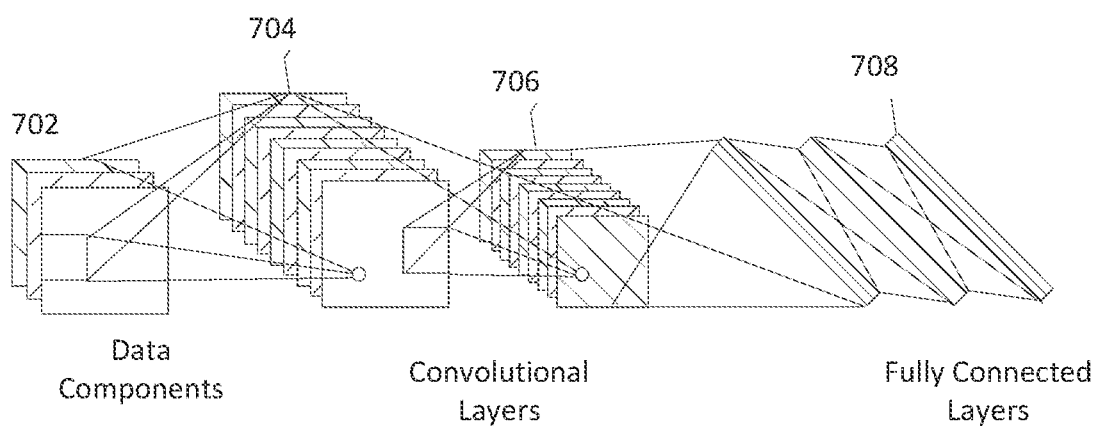
Figure 7C:
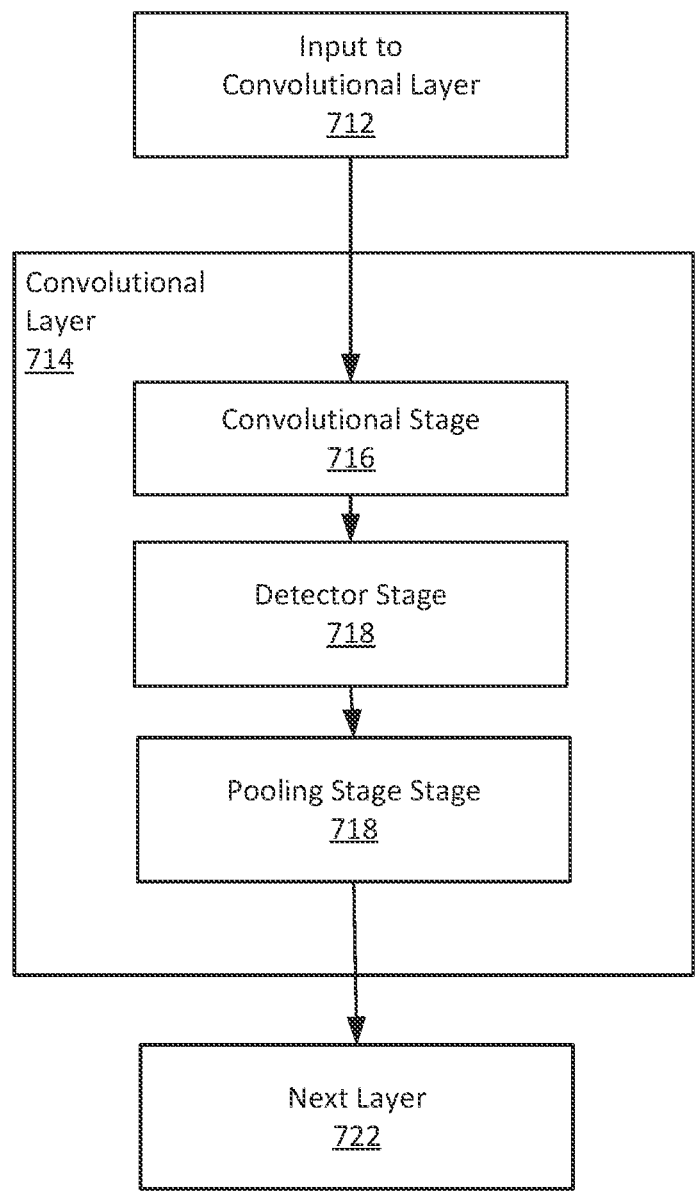

FIG. 2 illustrates an example of an interface to input performance indicator preferences, according to some embodiments. In some embodiments, an apparatus, system, or process may include an interface, such as the example performance indicator preference interface 200 shown in FIG. 2, to enable a client to input performance indicator preferences. As further described below, an apparatus, system, or process is then to automatically optimize hardware for processing of a deep learning workload. Further details regarding deep neural network operation and structure are illustrated in FIGS. 7A-7C.

In some embodiments, the interface 200 may include inputs for performance indicator weightings 210, the relative weightings to represent the preferences of a client regarding one or more of the performance indicators. The inputs are shown as slide bars for input of relative weights for a certain set of performance indicators, which are power, throughput, and latency in this illustration. The interface 200 may further include inputs for threshold values (Hard Constraints) 220 for one or more of the performance indicators. In this illustration the relevant client has provides a threshold value of less than 11 Watts for power, and greater than 3,000 ips (instructions per second) for throughput.

In some embodiments, an apparatus, system, or process is to automatically generate one or more hardware mappings based on the current performance indicator preferences. The interface 200 may further include an output 230 to show one or more best hardware mappings based on the clients indicated performance preferences. In this particular example, multiple different mappings have been provided to allow the client to select one of the automatically generated hardware mappings. In an alternative example, a single best matching hardware mapping may be provided as an output.

While FIG. 2 provides a particular example of an interface for a client to input performance indicator preferences, embodiments are not limited to an operation utilizing such interfaces. Embodiments may include any process or apparatus for receiving or determining performance indicator preferences for a particular deep learning workload. Other examples may include accessing known preference settings for certain clients, receiving performance indicator preferences from third parties, guessing performance indicator preferences from a type of deep learning workload, etc.

The general reinforcement learning setup consists of an agent interacting with an environment to perform a given task. This setup is commonly formalized as a Markov Decision Process (MDP), consisting of interactions over a finite number of discrete time steps. At each time step t, the agent observes a state st and maps this state to an action $a_t$ using its policy π. The agent receives a scalar reward $r_t$ and transitions to the next state $s_{t+1}$. The process continues until the agent reaches a terminal state marking the end of an episode.

In this process, a return is expressed as follows:

$$R_t = \Sigma_{k=0}^{\infty} \gamma^k r_{t+k} \qquad [1]$$

In Eq. [1], $R_t$ is the total return from time step t with discount factor $\gamma \in (0,1]$. The goal of the agent is to maximize this expected return. Further, the state-value function $\rho^\pi(s, a)$ describes the expected return from state s after taking action a and subsequently following policy π.

Figure 3:
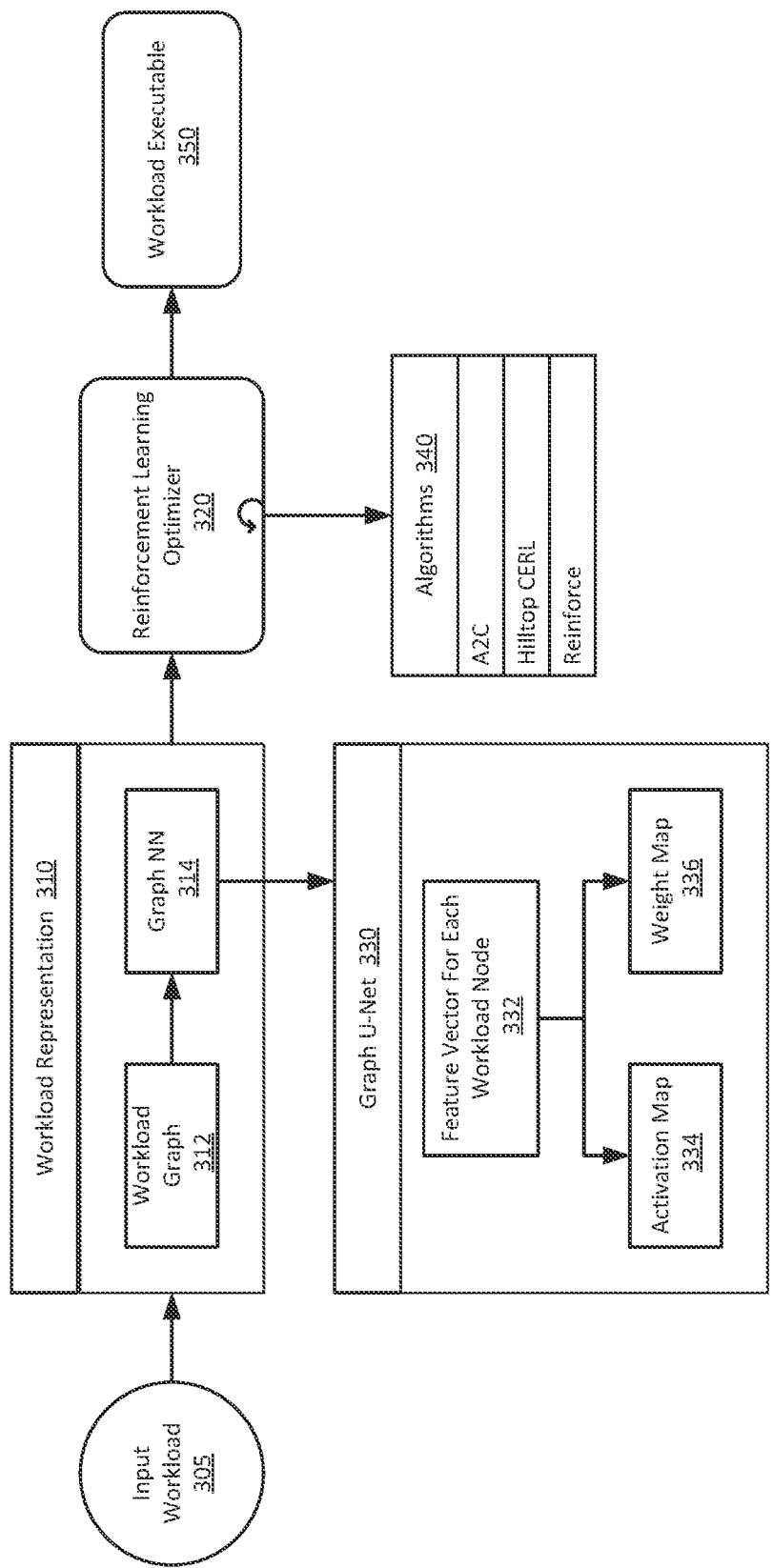
FIG. 3 is an illustration of an operation for optimizing hardware mappings with reinforcement learning, according to some embodiments.
Figure 4:
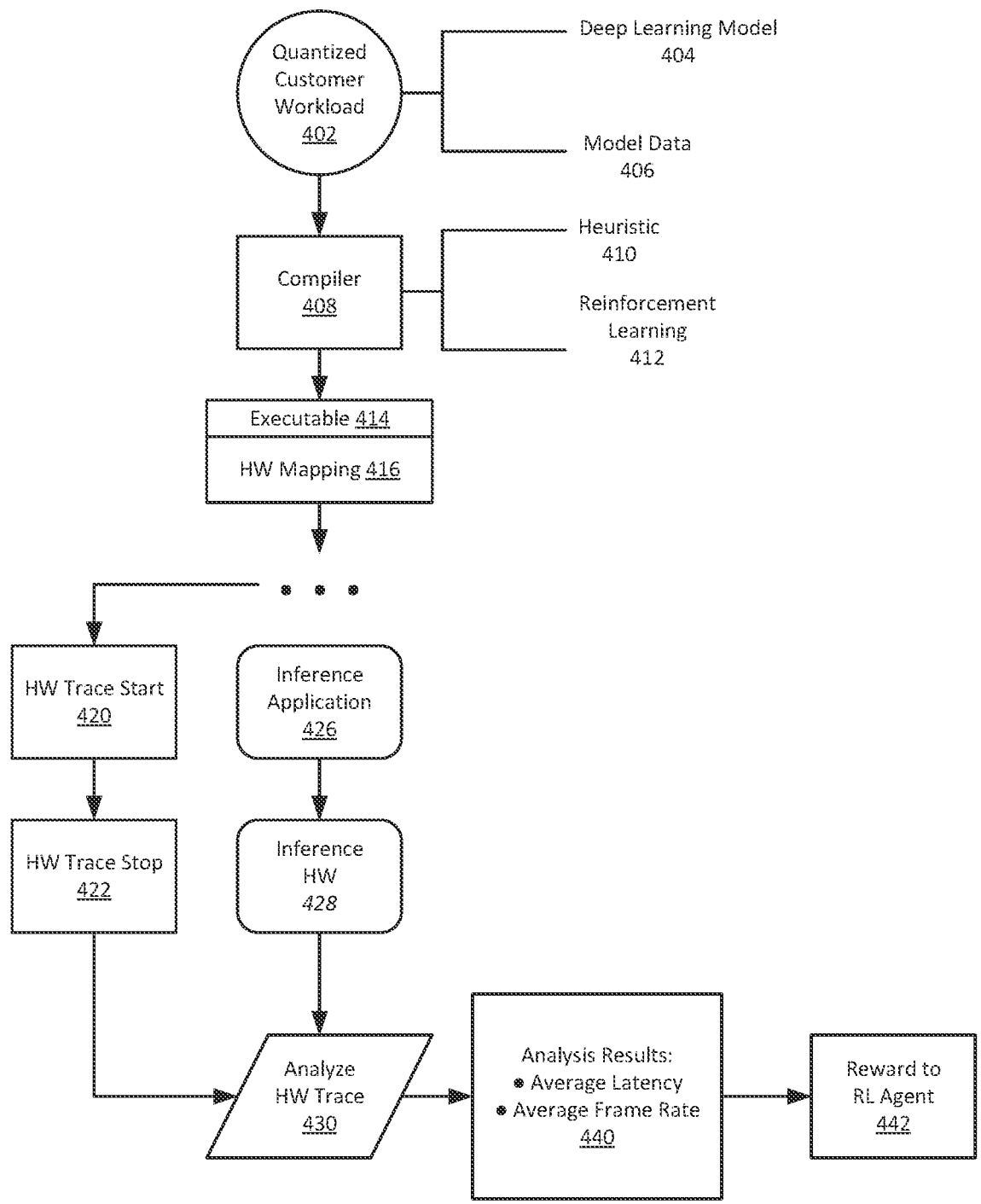
FIG. 4 is an illustration of an operation to create rewards for agents in a population based reinforcement learning system for hardware mapping optimization, according to some embodiments.

In some embodiments, the hardware mapping decisions of the compiler are converted into an RL setup, where an RL agent decides the hardware mapping. As such, the problem of mapping the computational graph is to be transformed into a Markov decision process (MDP) setup that provides a state, an action, and a return. FIGS. 3 and 4 depicts example processes for this operation.

FIG. 3 is an illustration of an operation for optimizing hardware mappings with reinforcement learning, according to some embodiments. For the RL formulation described above, a state space of a computational graph by a graph neural network may be presented. An embodiment of a workflow is depicted in FIG. 3. FIG. 3 illustrates the integration of a graph neural network as a pre-processor for a state space that is trained through an RL algorithm in an end-to-end fashion. The graph neural network exploits the inherent nature of the computational graph setup of deep neural networks, and makes the overall training process very tractable and scalable.

More specifically, as illustrated in FIG. 3, an input workload 305 is received, and a workload representation 310 is produced. In this operation, a workload graph 312 is generated to produce a graph neural network 314. The graph of the neural network is provided to a graph U-Net 330, which produces a feature vector for each workload node 332, with an activation map 334 and a weight map 335 for the neural network.

In some embodiments, the workload representation 310 is provided to a reinforcement learning (RL) optimizer 320, the RL optimizer including use of one or more reinforcement learning algorithms (agents) 340, which may include, but are not limited to, A2C (Advantage Actor Critic), Hilltop CERL, or Reinforce. The RL optimizer then produces a workload executable 350.

FIG. 4 is an illustration of an operation to create rewards for agents in a population based reinforcement learning system for hardware mapping optimization, according to some embodiments. In the illustrated operation for generation of a reward for an RL agent, a quantized customer workload 402 is received, including a deep learning model 404 and model data 406. The workload 402 is receiving at a compiler 408, utilizing a particular heuristic 410 and reinforcement learning 412 in processing. The compiler 408 is to generate an executable 414 including hardware mapping 416, and to proceed to processing operation.

In some embodiments, the executable is received at an inference application 426 for processing by inference hardware 428. A hardware trace is to be performed, shown as hardware trace start 420 and hardware trace stop 422.

The results of the inference and the hardware trace are then utilized to perform an analysis of the hardware trace 430, with the analysis results 440 including, for example, average latency and average frame rate. Such results then are provided as a reward to the RL agent 442 in the reinforcement learning operation.

Figure 5:
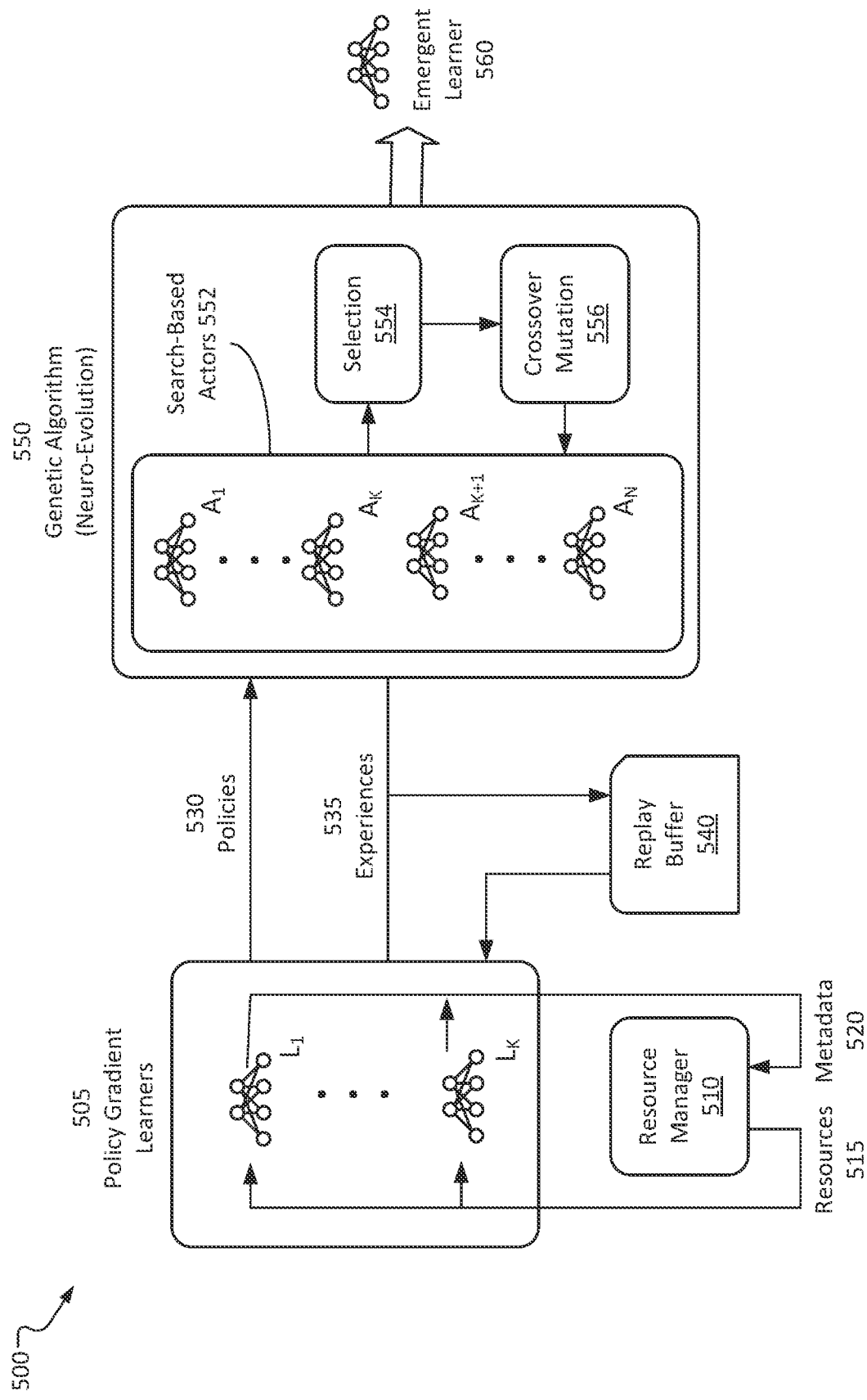
FIG. 5 is an illustration of a population based reinforcement learning method for hardware optimization, according to some embodiments.

FIG. 5 is an illustration of a population based reinforcement learning method for hardware optimization, according to some embodiments. FIG. 5 illustrates an overview of the reinforcement learning process 500 utilized in an embodiment. In some embodiments, each neural network represents a stand-alone RL policy that maps the states of the workload to actions that correspond to the actual hardware maps. In some embodiments, an operation in generation may in general utilize gradient-based algorithms combined with search-based algorithms to provide reinforcement learning.

In some embodiments, a population of learners are trained based on standard policy gradient methods. As illustrated in FIG. 5, policy gradient learners 505, shown as $L_1$ through $L_K$, receive resources 515 from a resource manager 520, which receives metadata from such learners 505. The gradient based learners 505 are generally not stable learners in the face of sparse or complex rewards, such as the case with complex KPIs, but are fast learners due to gradient based learning.

In some embodiments, the policy gradient learners 505 provide determined gradient based policies 530 to a second population of search-based actors 552, such as actors for a genetic algorithm 550. Genetic algorithm refers to an algorithm utilized to generate solutions to optimization and search problems through biologically inspired operators such as mutation, crossover, and selection. The genetic algorithm 550 may include the commonly used neuro-evolution algorithm. In general, neuro-evolution is a form of artificial intelligence that uses evolutionary algorithms to generate artificial neural networks, parameters, topology, and rules. In some embodiments, the search-based actors 552 are to search in their own parameter space for the most optimal state-action mapping using neuro-evolution. As shown, there is a selection of policies 554, followed by crossover and mutation of policies 556, which are fed back to the actors 552.

In isolation, neuro-evolution may be expected to be too slow and sample inefficient to arrive at useful solutions. However, neuro-evolution is very effective at optimizing on the main goal, which is maximization of the KPI. Thus, the two populations, policy gradient learners 505 and search-based actors 552, are complimentary to each other in operation. Information exchange between the two populations is achieved by direct migration of gradient based policies 530 from the policy gradient learners 505 to the evolutionary population of search-based actors 552. In addition, all policies log their experiences 535 (state→action→reward) into one or more replay buffers 540, which feed back to the policy gradient leaners 505.

In this manner, the fast but less stable gradient based learners 505 are able to sample from stable trajectories explored by the evolutionary population search-based actors 552, and thus may be applied in providing automatic multi-objection hardware optimization. The learning process then produces an emergent learner 560 for application in the hardware selection.

It is noted that, in the standard population based RL approach, the evolutionary population is ranked based on a single fitness function. Elite policies are retained and used to produce performant offspring. At any given time, the champion policy is deployed as the most optimal RL solution. In some embodiments, for the hardware mapping operation this approach is transformed such that, instead of a single KPI, the evolutionary population allows for multiple canonical KPIs. In this context, canonical KPIs are all sub-objectives that are possible to be optimized for a given hardware platform and API. For example, if latency and power are two canonical KPIs, sub-populations in the evolutionary block may be defined to maximize such KPIs separately. Thus, in this example, at any given time a subset of the evolutional population may be elite (i.e., optimized) power-optimizers and another subset may be elite latency-optimizers. Further, because evolution also involves generating off-spring by mutation and cross-over of parent policies 556, some policies in the evo population will effectively optimize some combination of the two KPIs. In some embodiments, an apparatus, system, or process is to specifically solve for the Pareto front of these policies. This allows an embodiment to search along this front for a given weighted combination of the different sub-KPIs, and thus solve for an optimized solution that based on the particular KPI preferences for a client.

Figure 6:
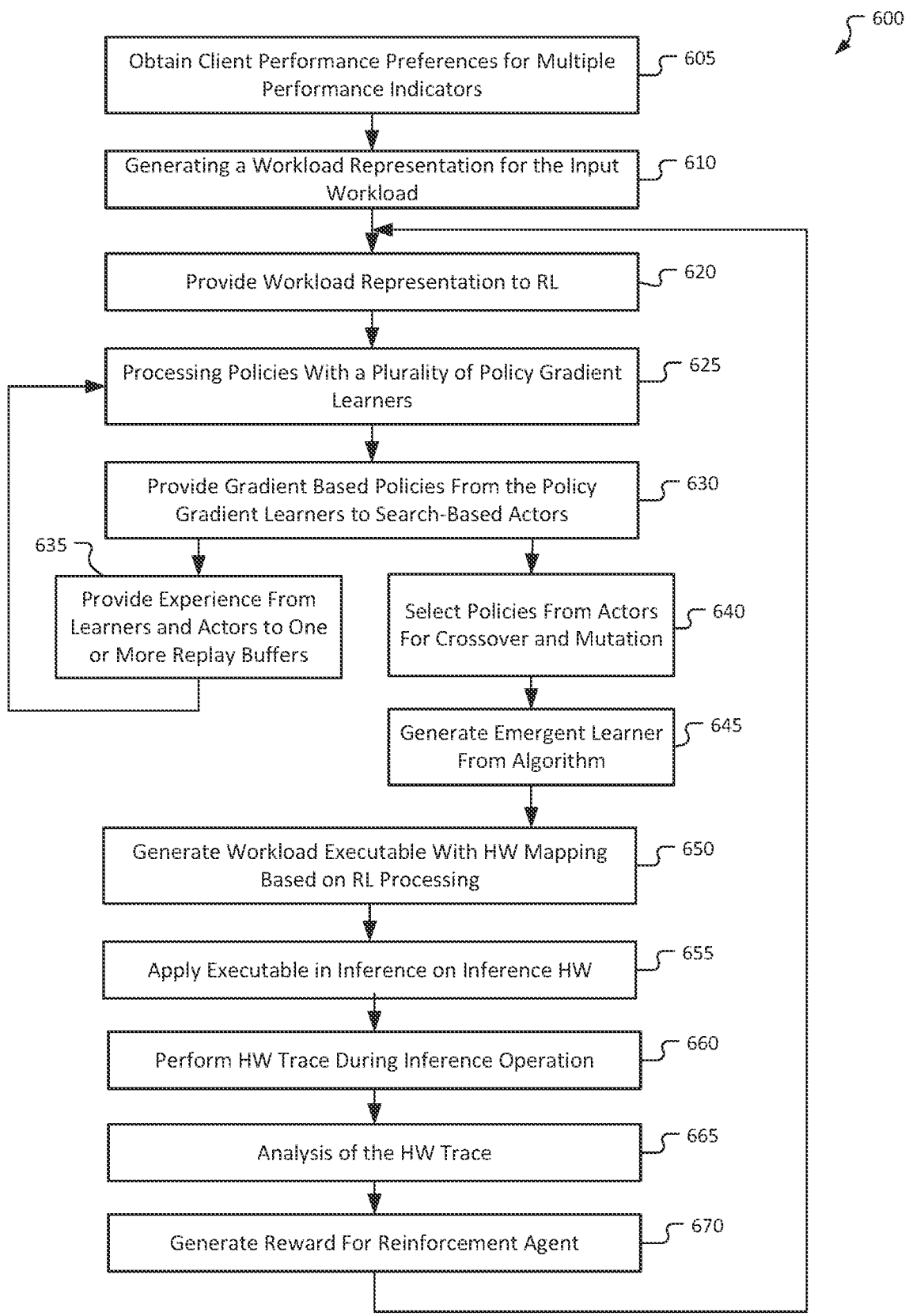
FIG. 6 is a flowchart to illustrate a process for automatic hardware optimization for deep learning execution.

FIG. 6 is a flowchart to illustrate a process for automatic hardware optimization for deep learning execution. In some embodiments, a process 600 includes obtaining client preferences for multiple performance indicators for processing of a deep learning workload 605. The performance preferences may include relative weightings for the multiple performance indicators, which may be expressed as a plurality of KPI preferences. The plurality of performance indicators may include, but are not limited to, throughput, latency, core coverage, and power consumption. The performance preferences may further include threshold values for one or more of the performance indicators, or other limitations regarding such performance indicators. The receipt of the performance preferences may include receiving input from a client via an interface, such as the example interface illustrated in FIG. 2.

In some embodiments, the process further includes generating a workload representation for the input workload 610, which may include generating a feature vector for each workload node. The process then proceeds with providing the workload representation to reinforcement learning (RL) processing 620, including:

Processing policies with a plurality of policy gradient learners 625, including receiving resources from a resource manager and providing metadata to the resource manager.

Providing gradient based policies from the policy gradient learners to a plurality of search-based actors 630, such as for processing a genetic algorithm (for example, neuro-evolution).

Providing experience from the policy gradient learners and the genetic algorithm actors to one or more replay buffers 635, providing feedback to the policy gradient learners 625.

Selecting policies from the search-based actors for crossover and mutation (to combine genetic information from parents to generate new policies) 640.

Generating an emergent learner from the genetic algorithm 645.

In some embodiments, the process proceeds with generating a workload executable with optimized hardware mapping based on the reinforcement learning processing 650. In some embodiments, the executable may then be applied in an inference application on particular inference hardware according to the hardware mapping 655, with a hardware trace being performed during the inference operation 660. The hardware trace is then analyzed 660, resulting in generating a reward to the reinforcement agent 670 in the performance of the reinforcement learning processing 620.

FIGS. 7A-7C illustrate examples of neural networks that may be processed utilizing processing hardware that has been configured according to client preferences, according to some embodiments. The client preferences include client preferences regarding a set of multiple performance indicators, such as client preferences received via an interface, such as the interface illustrated in FIG. 2.

As illustrated in FIG. 7A, a neural network 740 includes a collection of connected units or nodes 745, also referred to as artificial neurons. Typically, nodes are arranged in multiple layers. Different layers may perform different transformations on their inputs. In this simplified illustration the neural network includes the nodes in layers that include an input layer 750, one or more hidden layers 755, and an output layer 760. Each connection (or edge) 765 can transmit a signal to other nodes 745. A node 745 that receives a signal may then process it and signal nodes connected to it. The nodes and edges typically have a weight that adjusts as learning proceeds.

Neural networks, including feedforward networks, CNNs (Convolutional Neural Networks, and RNNs (Recurrent Neural Networks) networks, may be used to perform deep learning. Deep learning refers to machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

FIG. 7B illustrates various layers within a CNN. As shown in FIG. 7B, an exemplary CNN used to, for example, model image processing can receive input 702 describing the red, green, and blue (RGB) components of an input image (or any other relevant data for processing). The input 702 can be processed by multiple convolutional layers (e.g., convolutional layer 704 and convolutional layer 706). The output from the multiple convolutional layers may optionally be processed by a set of fully connected layers 708. Neurons in a fully connected layer have full connections to all activations in the previous layer, as previously described for a feedforward network. The output from the fully connected layers 708 can be used to generate an output result from the network. The activations within the fully connected layers 708 can be computed using matrix multiplication instead of convolution. Not all CNN implementations make use of fully connected layers 708. For example, in some implementations the convolutional layer 706 can generate output for the CNN.

The convolutional layers are sparsely connected, which differs from traditional neural network configuration found in the fully connected layers 708. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 7C illustrates exemplary computation stages within a convolutional layer of a CNN. Input to a convolutional layer 712 of a CNN can be processed in three stages of a convolutional layer 714. The three stages can include a convolution stage 716, a detector stage 718, and a pooling stage 720. The convolution layer 714 can then output data to a successive convolutional layer 722. The final convolutional layer of the network can generate output feature map data or provide input to a fully connected layer, for example, to generate a classification value for the input to the CNN.

In the convolution stage 716 several convolutions may be performed in parallel to produce a set of linear activations. The convolution stage 716 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 714.

The linear activations can be processed by a detector stage 718. In the detector stage 718, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0,x)$, such that the activation is thresholded at zero.

The pooling stage 720 uses a pooling function that replaces the output of the convolutional layer 706 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 720, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 714 can then be processed by the next layer 722. The next layer 722 can be an additional convolutional layer or one of the fully connected layers 708. For example, the first convolutional layer 704 of FIG. 7A can output to the second convolutional layer 706, while the second convolutional layer can output to a first layer of the fully connected layers 708.

Figure 8:
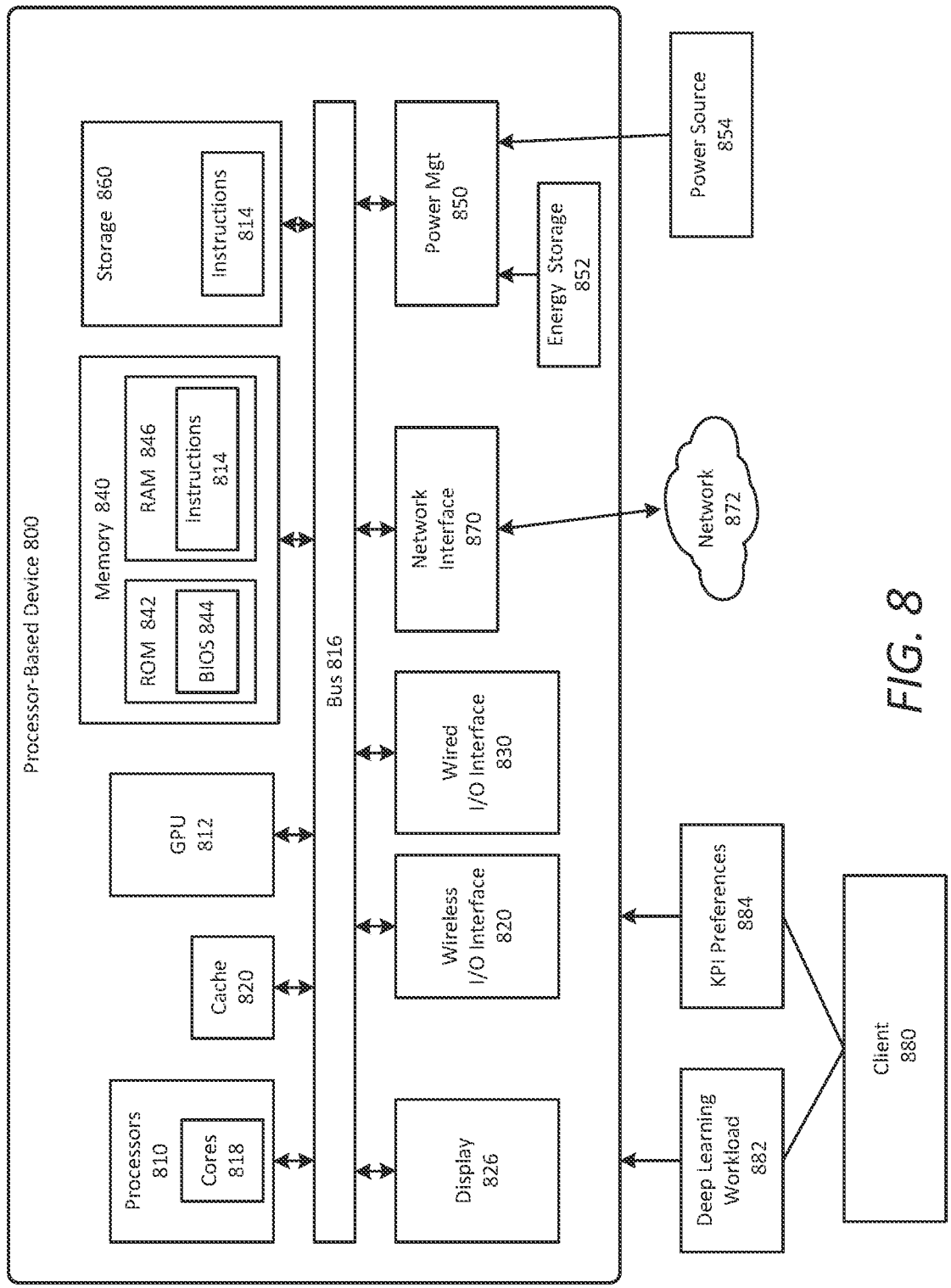
FIG. 8 is a schematic diagram of an illustrative electronic computing device to enable automatic hardware optimization for processing a deep learning network, according to some embodiments.

FIG. 8 is a schematic diagram of an illustrative electronic computing device to enable automatic hardware optimization for processing a deep learning network, according to some embodiments. In some embodiments, an example computing device 800 includes one or more processors 810 including one or more processors cores 818. In some embodiments, the computing device is to provide an automatic, data driven optimization framework that is capable of jointly optimizing on a wide range of performance objectives for neural network inference hardware, as further illustrated in FIGS. 1-7C.

In some embodiments, the computing device 800 is to obtain a set of performance preferences for processing of deep neural network, which is illustrated in FIG. 8 as computing device 800 receiving a deep learning workload 882 and a set of KPI preferences 884 from a client 880. In some embodiments, the computing device is to utilize the KPI preferences in determining an optimized hardware solution.

The computing device 800 further includes memory, which may include read-only memory (ROM) 842 and random access memory (RAM) 846. A portion of the ROM 842 may be used to store or otherwise retain a basic input/output system (BIOS) 844. The BIOS 844 provides basic functionality to the computing device 800, for example by causing the processor cores 818 to load and/or execute one or more machine-readable instruction sets 814. In embodiments, at least some of the one or more machine-readable instruction sets 814 cause at least a portion of the processor cores 818 to process and to process data, including data for a convolutional neural network (CNN) 815. In some embodiments, the one or more instruction sets 814 may be stored in one or more data storage devices 860, wherein the processor cores 818 are capable of reading data and/or instruction sets 814 from one or more non-transitory data storage devices 860 and writing data to the one or more data storage devices 860.

Computing device 800 is a particular example of a processor based device. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The example computing device 800 may be implemented as a component of another system such as, for example, a mobile device, a wearable device, a laptop computer, a tablet, a desktop computer, a server, etc. In one embodiment, computing device 800 includes or can be integrated within (without limitation): a server-based gaming platform; a game console, including a game and media console; a mobile gaming console, a handheld game console, or an online game console. In some embodiments the computing device 800 is part of a mobile phone, smart phone, tablet computing device or mobile Internet-connected device such as a laptop with low internal storage capacity. In some embodiments the computing device 800 is part of an Internet-of-Things (IoT) device, which are typically resource-constrained devices. IoT devices may include embedded systems, wireless sensor networks, control systems, automation (including home and building automation), and other devices and appliances (such as lighting fixtures, thermostats, home security systems and cameras, and other home appliances) that support one or more common ecosystems, and can be controlled via devices associated with that ecosystem, such as smartphones and smart speakers.

Computing device 800 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the computing device 800 includes or is part of a television or set top box device. In one embodiment, computing device 800 can include, couple with, or be integrated within a self-driving vehicle such as a bus, tractor trailer, car, motor or electric power cycle, plane or glider (or any combination thereof). The self-driving vehicle may use computing system 800 to process the environment sensed around the vehicle.

The computing device 800 may additionally include one or more of the following: a memory cache 820, a graphical processing unit (GPU) 812 (which may be utilized as a hardware accelerator in some implementations), a wireless input/output (I/O) interface 825, a wired I/O interface 830, power management circuitry 850, an energy storage device (such as a battery, a connection to external power source, and a network interface 870 for connection to a network 872. The following discussion provides a brief, general description of the components forming the illustrative computing device 800. Example, non-limiting computing devices 800 may include a desktop computing device, blade server device, workstation, or similar device or system.

The processor cores 818 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 800 includes a bus or similar communications link 816 that communicably couples and facilitates the exchange of information and/or data between the various system components. The computing device 800 may be referred to in the singular herein, but this is not intended to limit the embodiments to a single computing device 800, since in certain embodiments, there may be more than one computing device 800 that incorporates, includes, or contains any number of communicably coupled, collocated, or remote networked circuits or devices.

The processor cores 818 may include any number, type, or combination of currently available or future developed devices capable of executing machine-readable instruction sets.

The processor cores 818 may include (or be coupled to) but are not limited to any current or future developed single- or multi-core processor or microprocessor, such as: one or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks need not be described in further detail herein, as they will be understood by those skilled in the relevant art. The bus 816 that interconnects at least some of the components of the computing device 800 may employ any currently available or future developed serial or parallel bus structures or architectures.

The at least one wireless I/O interface 825 and at least one wired I/O interface 830 may be communicably coupled to one or more physical output devices (tactile devices, video displays, audio output devices, hardcopy output devices, etc.). The interfaces may be communicably coupled to one or more physical input devices (pointing devices, touchscreens, keyboards, tactile devices, etc.). The at least one wireless I/O interface 825 may include any currently available or future developed wireless I/O interface. Examples of wireless I/O interfaces include, but are not limited to Bluetooth®, near field communication (NFC), and similar. The wired I/O interface 830 may include any currently available or future developed I/O interface. Examples of wired I/O interfaces include, but are not limited to universal serial bus (USB), IEEE 1394 ("FireWire"), and similar.

The data storage devices 860 may include one or more hard disk drives (HDDs) and/or one or more solid-state storage devices (SSDs). The one or more data storage devices 860 may include any current or future developed storage appliances, network storage devices, and/or systems. Non-limiting examples of such data storage devices 860 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 860 may include one or more removable storage devices, such as one or more flash drives, flash memories, flash storage units, or similar appliances or devices capable of communicable coupling to and decoupling from the computing device 800.

The one or more data storage devices 860 may include interfaces or controllers (not shown) communicatively coupling the respective storage device or system to the bus 816. The one or more data storage devices 860 may store, retain, or otherwise contain machine-readable instruction sets, data structures, program modules, data stores, databases, logical structures, and/or other data useful to the processor cores 818 and/or graphics processor circuitry 812 and/or one or more applications executed on or by the processor cores 818 and/or graphics processor circuitry 812. In some instances, one or more data storage devices 860 may be communicably coupled to the processor cores 818, for example via the bus 816 or via one or more wired communications interfaces 830 (e.g., Universal Serial Bus or USB); one or more wireless communications interfaces 825 (e.g., Bluetooth®, Near Field Communication or NFC); and/or one or more network interfaces 870 (IEEE 802.3 or Ethernet, IEEE 802.11, or Wi-Fi®, etc.).

Processor-readable instruction sets 814 and other programs, applications, logic sets, and/or modules may be stored in whole or in part in the system memory 840. Such instruction sets 814 may be transferred, in whole or in part, from the one or more data storage devices 860. The instruction sets 814 may be loaded, stored, or otherwise retained in system memory 840, in whole or in part, during execution by the processor cores 818 and/or graphics processor circuitry 812.

In embodiments, the energy storage device 852 may include one or more primary (i.e., non-rechargeable) or secondary (i.e., rechargeable) batteries or similar energy storage devices. In embodiments, the energy storage device 852 may include one or more supercapacitors or ultracapacitors. In embodiments, the power management circuitry 850 may alter, adjust, or control the flow of energy from an external power source 854 to the energy storage device 852 and/or to the computing device 800. The power source 854 may include, but is not limited to, a solar power system, a commercial electric grid, a portable generator, an external energy storage device, or any combination thereof.

For convenience, the processor cores 818, the graphics processor circuitry 812, the wireless I/O interface 825, the wired I/O interface 830, the data storage device 860, and the network interface 870 are illustrated as communicatively coupled to each other via the bus 816, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 818 and/or the graphics processor circuitry 812. In some embodiments, all or a portion of the bus 816 may be omitted and the components are coupled directly to each other using suitable wired or wireless connections.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 8 and other described processes may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments.

In Example 1, one or more non-transitory computer-readable storage mediums have stored thereon instructions that, when executed by one or more processors, cause the one or more processors to perform operations including: obtaining client preferences for a plurality of performance indicators for processing of a deep learning workload; generating a workload representation for the deep learning workload; providing the workload representation to machine learning processing to generate a workload executable, the workload executable including hardware mapping based on the client preferences for the plurality of performance indicators; and applying the workload executable in processing of the deep learning workload.

In Example 2, providing the workload representation to machine learning processing includes utilizing reinforcement learning.

In Example 3, the reinforcement learning processing includes one or both of the following: processing by a plurality of policy gradient learners; or processing by a plurality of search-based actors.

In Example 4, the reinforcement learning processing includes providing experience from both the plurality of policy gradient learners and the plurality of search-based actors to one or more replay buffers.

In Example 5, the search-based actors include genetic algorithm actors.

In Example 6, the genetic algorithm includes neuro-evolution.

In Example 7, applying the workload executable includes applying the workload executable to inference processing.

In Example 8, the client preferences include a weighting for one or more of the plurality of performance indicators.

In Example 9, the client preferences further include a threshold for one or more of the plurality of performance indicators.

In Example 10, the plurality of performance indicators include one or more of throughput, latency, core coverage, and power consumption.

In Example 11, aa apparatus includes one or more processors; and a memory for storage of data, including data for one or more neural networks, wherein the one or more processors are to: obtain client preferences for a plurality of performance indicators for processing of a deep learning workload; generate a workload representation for the deep learning workload; provide the workload representation to machine learning processing to generate a workload executable, the workload executable including hardware mapping based on the client preferences for the plurality of performance indicators, the machine learning processing including reinforcement learning; and apply the workload executable in processing of the deep learning workload.

In Example 12, the reinforcement learning includes one or both of the following: processing by a plurality of policy gradient learners; or processing by a plurality of search-based actors.

In Example 13, the reinforcement learning processing includes providing experience from both the plurality of policy gradient learners and the plurality of search-based actors to one or more replay buffers.

In Example 14, the search-based actors include genetic algorithm actors.

In Example 15, applying the workload executable includes applying the workload executable to inference processing.

In Example 16, computing system includes one or more processors; and a memory for storage of data, including data for one or more neural networks, wherein the computing system includes an optimization tool to optimize processing of neural networks, the computing system to apply the optimization tool to: obtain client preferences for a plurality of performance indicators for processing of a deep learning workload; generate a workload representation for the deep learning workload; provide the workload representation to machine learning processing to generate a workload executable, the workload executable including hardware mapping based on the client preferences for the plurality of performance indicators; and apply the workload executable in processing of the deep learning workload, including applying the workload executable to inference processing.

In Example 17, the machine learning processing includes reinforcement learning, the reinforcement learning processing includes one or both of the following: processing by a plurality of policy gradient learners; or processing by a plurality of search-based actors.

In Example 18, the reinforcement learning processing includes providing experience from both the plurality of policy gradient learners and the plurality of search-based actors to one or more replay buffers.

In Example 19, the search-based actors include genetic algorithm actors.

In Example 20, the client preferences include a weighting for one or more of the plurality of performance indicators.

In Example 21, an apparatus includes means for obtaining client preferences for a plurality of performance indicators for processing of a deep learning workload; means for generating a workload representation for the deep learning workload; means for providing the workload representation to machine learning processing to generate a workload executable, the workload executable including hardware mapping based on the client preferences for the plurality of performance indicators; and means for applying the workload executable in processing of the deep learning workload.

In Example 22, the means for providing the workload representation to machine learning processing includes means for utilizing reinforcement learning.

In Example 23, the reinforcement learning processing includes one or both of the following: processing by a plurality of policy gradient learners; or processing by a plurality of search-based actors.

In Example 24, the reinforcement learning processing includes providing experience from both the plurality of policy gradient learners and the plurality of search-based actors to one or more replay buffers.

In Example 25, the search-based actors include genetic algorithm actors.

In Example 26, the genetic algorithm includes neuro-evolution.

In Example 27, the means for applying the workload executable includes means for applying the workload executable to inference processing.

In Example 28, the client preferences include a weighting for one or more of the plurality of performance indicators.

In Example 29, the client preferences further include a threshold for one or more of the plurality of performance indicators.

In Example 30, the plurality of performance indicators include one or more of throughput, latency, core coverage, and power consumption.

Specifics in the Examples may be used anywhere in one or more embodiments.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. One or more non-transitory computer-readable storage mediums having stored thereon instructions that, when executed by one or more processors, cause the one or more processors to perform operations comprising:
receiving an input including client preferences for a plurality of performance indicators for processing of a deep learning workload on a computing system, the computing system including one or more processors;
performing automatic hardware optimization for the processing of the deep learning workload, including:
generating, by the one or more processors, a workload representation for the deep learning workload, wherein generating the workload representation includes generating a graph neural network, and
providing the workload representation to machine learning processing by the one or more processors to generate, by the one or more processors, a workload executable, generating the workload executable including generating hardware mapping, the hardware mapping being generated based on the client preferences for the plurality of performance indicators; and
applying the workload executable in processing of the deep learning workload by the one or more processors, including implementing the hardware mapping for the processing of the deep learning workload.

2. The storage medium of claim 1, wherein providing the workload representation to machine learning processing by the one or more processors includes utilizing reinforcement learning in the generation of the hardware mapping.

3. The storage medium of claim 2, wherein the reinforcement learning processing includes one or both of the following:
processing by a plurality of policy gradient learner algorithms; or
processing by a plurality of search-based actor algorithms.

4. The storage medium of claim 3, wherein the reinforcement learning processing includes providing experience from both the plurality of policy gradient learner algorithms and the plurality of search-based actor algorithms to one or more replay buffers.

5. The storage medium of claim 3, wherein the search-based actor algorithms include genetic algorithm actors.

6. The storage medium of claim 5, wherein the genetic algorithm includes neuro-evolution.

7. The storage medium of claim 1, wherein applying the workload executable by the one or more processors includes applying the workload executable to inference processing.

8. The storage medium of claim 1, wherein the received client preferences include a weighting for one or more of the plurality of performance indicators.

9. The storage medium of claim 8, wherein the received client preferences further include a threshold for one or more of the plurality of performance indicators.

10. The storage medium of claim 8, wherein the plurality of performance indicators include one or more of throughput, latency, core coverage, and power consumption in operation of the computing system for deep learning processing.

11. An apparatus comprising:
one or more processors; and
a memory for storage of data, including data for one or more neural networks;
wherein the one or more processors are to:
receive an input includes client preferences for a plurality of performance indicators for processing of a deep learning workload by the one or more processors;
perform automatic hardware optimization for the processing of the deep learning workload, including:
generate a workload representation for the deep learning workload, wherein generating the workload representation includes generating a graph neural network, and
provide the workload representation to machine learning processing to generate a workload executable, generating the workload executable including generating hardware mapping, the hardware mapping being generated based on the client preferences for the plurality of performance indicators, the machine learning processing including reinforcement learning in the generation of the hardware mapping; and
apply the workload executable in processing of the deep learning workload, including implementing the hardware mapping for the processing of the deep learning workload.

12. The apparatus of claim 11, wherein the reinforcement learning includes one or both of the following:
processing by a plurality of policy gradient learners algorithms; or processing by a plurality of search-based actor algorithms.

13. The apparatus of claim 12, wherein the reinforcement learning processing includes providing experience from both the plurality of policy gradient learner algorithms and the plurality of search-based actor algorithms to one or more replay buffers.

14. The apparatus of claim 12, wherein the search-based actor algorithms include genetic algorithm actors.

15. The apparatus of claim 11, wherein applying the workload executable includes applying the workload executable to inference processing.

16. A computing system comprising:
one or more processors; and
a memory for storage of data, including data for one or more neural networks;
wherein the computing system includes an automatic hardware optimization tool to optimize processing of neural networks, the computing system to apply the automatic hardware optimization tool to:
receive an input including client preferences for a plurality of performance indicators for processing of a deep learning workload by the one or more processors;
perform automatic hardware optimization for the processing of the deep learning workload, including:
generate a workload representation for the deep learning workload, wherein generating the workload representation includes generating a graph neural network, and
provide the workload representation to machine learning processing by the one or more processors to generate a workload executable, generating the workload executable including generating hardware mapping, the hardware mapping being generated based on the client preferences for the plurality of performance indicators; and
apply the workload executable in processing of the deep learning workload by the one or more processors, including applying the workload executable to inference implementing the hardware mapping for the processing of the deep learning workload.

17. The computing system of claim 16, wherein the machine learning processing includes reinforcement learning, the reinforcement learning processing includes one or both of the following:
processing by a plurality of policy gradient learner algorithms; or
processing by a plurality of search-based actor algorithms.

18. The computing system of claim 17, wherein the reinforcement learning processing includes providing experience from both the plurality of policy gradient learners and the plurality of search-based actors to one or more replay buffers.

19. The computing system of claim 17, wherein the search-based actor algorithms include genetic algorithm actors.

20. The computing system of claim 16, wherein the received client preferences include a weighting for one or more of the plurality of performance indicators.

* * * * *